United States Patent
Sawyers et al.

(10) Patent No.: US 8,433,201 B2
(45) Date of Patent: Apr. 30, 2013

(54) DYNAMIC GAIN EQUALIZER-MONITOR

(75) Inventors: Bryce Daniel Sawyers, Allen, TX (US); Donald A. Powell, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 2575 days.

(21) Appl. No.: 10/357,857

(22) Filed: Feb. 3, 2003

(65) Prior Publication Data
US 2004/0151496 A1  Aug. 5, 2004

(51) Int. Cl.
*H04B 10/12* (2006.01)

(52) U.S. Cl.
USPC .............. 398/149; 398/25; 398/30; 398/33; 398/84

(58) Field of Classification Search ........... 398/25, 398/30, 33, 84
See application file for complete search history.

(56) References Cited

U.S. PATENT DOCUMENTS

| | | | |
|---|---|---|---|
| 5,210,590 A * | 5/1993 | Landa et al. | 356/319 |
| 6,275,623 B1 * | 8/2001 | Brophy et al. | 385/14 |
| 6,614,828 B1 * | 9/2003 | Basting et al. | 372/100 |
| 2002/0118443 A1 | 8/2002 | Howell et al. | |
| 2003/0076594 A1 * | 4/2003 | Kramer | 359/569 |
| 2003/0133487 A1 * | 7/2003 | Vogler | 372/55 |
| 2004/0120049 A1 * | 6/2004 | Bartlett et al. | 359/627 |

* cited by examiner

*Primary Examiner* — Danny Leung
(74) *Attorney, Agent, or Firm* — Warren L. Franz; Wade J. Brady, III; Frederick J. Telecky, Jr.

(57) ABSTRACT

A dynamic gain equalizer-monitor (DGEM) includes a light modulator operable to modulate one or more component wavelengths of an input optical signal. The DGEM also includes a grating operable to receive one or more modulated component wavelengths from the light modulator. The grating is also operable to combine a first portion of each of the one or more modulated component wavelengths and transmit that first portion into an output optical signal. The DGEM may also include a detector array operable to receive, from the grating, a second portion of modulated component wavelengths that are separated from the first portion by the grating. The detector array is operable to generate an electrical signal proportional to an optical characteristic associated with each of the modulated component wavelengths of the second portion.

26 Claims, 2 Drawing Sheets

DYNAMIC GAIN EQUALIZER-MONITOR

TECHNICAL FIELD OF THE INVENTION

This invention relates to the field of optical networks, and more particularly to an dynamic gain equalizer-monitor.

BACKGROUND OF THE INVENTION

Typical components in an optical network may include combiners, separators, optical fiber spans, and optoelectrical components, such as dynamic gain equalizers (DGEs), optical performance monitors (OPMs), amplifiers, and optical add/drop multiplexers (OADMs). Each optoelectrical component coupled to an optical network introduces increased complexity and cost to the network, potentially reduces network reliability, and introduces optical performance losses. DGEs are implemented in optical networks to equalize the signal strength of the various wavelengths in the optical signal, as the various wavelengths lose optical signal power at different rates as they travel through the network. In the process of equalizing the signal strength of the input wavelengths, a portion of the optical signal strength of the light input into the DGE is lost. This results in a reduction of signal strength of the optical signal output from the DGE as compared to the optical signal strength input to the DGE. In a similar manner, losses occur when the optical signal passes through the various OPMs that may be coupled to the optical network.

Dense Wavelength Division Multiplexing (DWDM) in optical networking requires nonintrusive optical monitoring of power, noise, wavelength accuracy, and line width to reduce the amount of optoelectronics and increase the reliability of the optical network. Optical signal losses, such as those created by DGEs and OPMs, are undesirable in optical networks. Therefore, a need exists to improve the efficiency and reliability of optical networking, while reducing component count, cost, and optical performance losses.

SUMMARY OF THE INVENTION

According to one embodiment of the present invention, a novel device for equalizing and monitoring optical signals in an optical network is disclosed.

According to one embodiment of the present invention, a DGEM includes a light modulator operable to modulate one or more component wavelengths of an input optical signal. The light modulator directs one or more modulated wavelengths of the optical signal to a grating contained in the DGEM. The grating is operable to combine a first portion of each of the modulated component wavelengths received from the light monitor and transmit the combined first portion as an output optical signal from the DGEM. A second portion of the modulated wavelengths, separated from the first portion, is directed to a detector array. The detector array receives the second portion of modulated wavelengths and generates an electrical signal proportional to an optical characteristic associated with each of the wavelengths. The electrical signals are converted into data using an analyzer which transmits the data to a controller. The data represent, for example, certain parameters of the modulated optical signal, such as signal strength, signal-to-noise ratio, and wavelength. The data are transmitted to a controller coupled to the light modulator. The controller uses the data to adjust the operation of the light modulator so as to achieve a desired optical performance, based on the data.

Embodiments of the present invention may provide one or more of the following important technical advantages. For example, one advantage of certain embodiments of the present invention is that a device is provided which allows for equalizing and monitoring of optical signals in a single device, preventing the loss in optical signal performance caused by the use of separate devices for equalizing and monitoring optical signals. Another advantage of particular embodiments of the present invention is a reduction in the component count in an optical network since functions normally provided by separate pieces of equipment—equalizing and monitoring optical signals—are accomplished in one piece of equipment, a dynamic gain equalizer-monitor (DGEM). Furthermore, certain embodiments use an efficient method for equalizing and monitoring optical signals that uses light that is normally separated from the input optical signal in a typical DGE, and goes unused, to monitor the optical performance of the optical signal.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
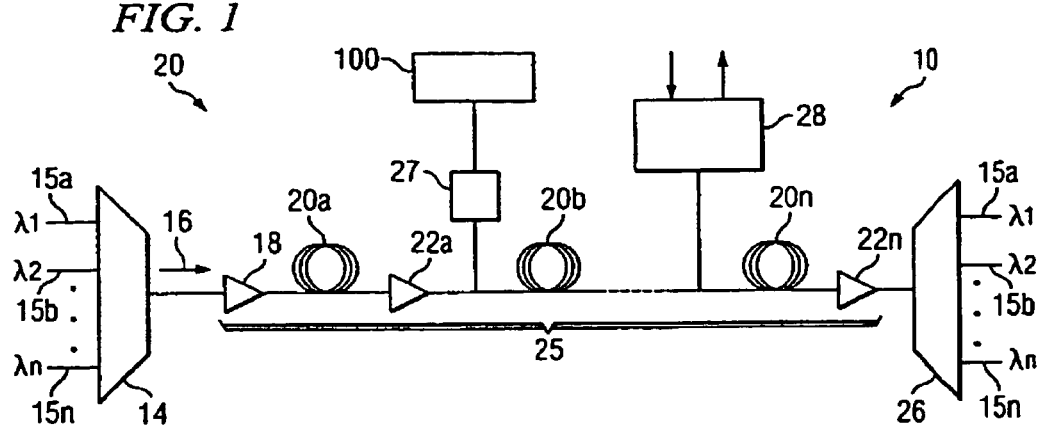
FIG. 1 illustrates an example optical communication system including at least one dynamic gain equalizer-monitor.

FIG. 1 is a block diagram showing at least a portion of an example optical communication system 10 operable to facilitate communication of an optical signal (indicated by arrow 16). Each optical signal 16 comprises a plurality of optical channels 15a-15n, each channel having an associated different wavelength. In the illustrated embodiment, system 10 also includes a combiner 14 operable to receive optical channels 15a-15n and to combine (multiplex) those channels into optical signal 16. As one particular example, combiner 14 could comprise a wavelength division multiplexer (WDM). The terms wavelength division multiplexer and wavelength division demultiplexer as used herein may include equipment operable to process wavelength division multiplexed signals, dense wavelength division multiplexed (DWDM) signals, and/or any other appropriate multiplexed signals. System 10 also includes a separator 26 separates optical channels 15a-15n from optical signal 16 received at the end of link 25. Separator 26 may comprise, for example, a wavelength division demultiplexer (WDM). Separator 26 communicates individual signal wavelengths or ranges of wavelengths to other appropriate components of system 10.

System 10 communicates optical signal 16 over an optical communication medium 20. Communication medium 20 may comprise a plurality of fiber spans 20a-20n. Fiber spans 20a-20n may comprise any appropriate form of optical fiber. Two or more spans of communication medium 20 can collectively form an optical link 25. In the illustrated example, communication medium 20 includes a single optical link 25 comprising numerous spans 20a-20n. System 10 could include any number of additional links coupled to link 25. For example, optical link 25 could comprise one optical link of a multiple link system, where each link is coupled to other links through, for example, optical regenerators.

In one embodiment, optical link 25 could comprise, for example, a unidirectional link or a bi-directional link. In another embodiment, optical link 25 could comprise a point-to-point communication link, or could comprise a portion of a larger communication network, such as a ring network, a mesh network, a star network, or any other network configuration.

System 10 further includes one or more access elements 28. For example, access element 28 could comprise an add/drop multiplexer, a cross-connect, or another device operable to terminate, cross-connect, switch, route, process, and/or provide access to and from optical link 25 and another optical link or communication device. System 10 may also include other lossy elements (not explicitly shown), such as an isolator or a dispersion compensating element.

System 10 may also include a plurality of optical amplifiers coupled to communication medium 20. In this example, system 10 may include a booster amplifier 18 operable to receive and amplify wavelengths of optical signal 16 in preparation for transmission over a communication medium 20. Where communication system 10 includes a plurality of fiber spans 20a-20n, system 10 can also include one or more in-line amplifiers 22a-22n. In-line amplifiers 22 couple to one or more spans 20a-20n and operate to amplify optical signal 16 as it traverses communication medium 20. Although optical link 25 is shown to include one or more booster amplifiers 18 and in-line amplifiers 22a-22n, one or more of the amplifier types could be eliminated and/or other types of amplifiers could be added in other embodiments.

Amplifiers 18 and 22 could each comprise, for example, one or more discrete Raman amplification stages, distributed Raman amplification stages, rare earth doped amplification stages, such as erbium doped or thulium doped stages, semiconductor amplification stages or a combination of these or other amplification stage types. In some embodiments, amplifiers 18 and 22 could each comprise bi-directional Raman amplifiers.

System 10 also includes one or more dynamic gain equalizer-monitors (DGEMs) 100 capable of equalizing the signal strengths of the various wavelengths in optical signal 16 and monitoring various characteristics of optical signal 16, such as signal strength, wavelength, or signal-to-noise ratio. DGEMs 100 may be coupled to any of spans 20a-20n through a circulator 27. Circulator 27 is operable to redirect optical signal 16 from one port in the circulator to another port in the circulator in one direction. For example, optical signal 16 travelling through optical communication medium 20 from combiner 14 towards separator 26 may be directed through circulator 27 and into DGEM 100 for equalization and/or monitoring. When optical signal 16 has been equalized and/or monitored by DGEM 100, optical signal 16 travels back through circulator 27 and is directed to continue travelling down communication medium 20 towards separator 26. In this example, a three port circulator is shown. However, any other appropriate circulator may be used as required by the configuration of system 10.

Figure 2:
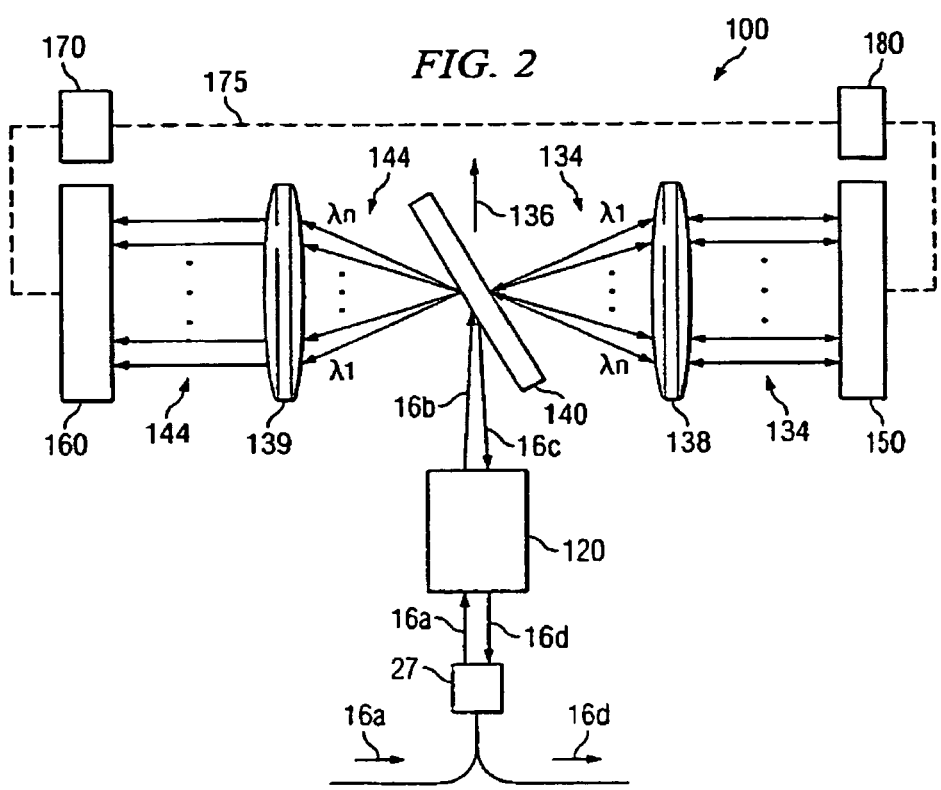
FIG. 2 illustrates example functional components of an dynamic gain equalizer-monitor.

FIG. 2 illustrates example functional components of DGEM 100. DGEM 100 combines the optical signal equalization functionality of a dynamic gain equalizer (DGE) with the optical signal monitoring functionality of an optical performance monitor (OPM), while reducing the overall complexity of system 10 and reducing losses. DGEM 100 is coupled to communication medium 20 to equalize the signal strengths of the various wavelengths comprising optical signal 16 and to monitor various characteristics of optical signal 16, such as signal strength, wavelength, and/or signal-to-noise ratio.

As explained above, optical signal 16 may travel to DGEM 100 via circulator 27. In the illustrated embodiment, DGEM 100 includes a collimator 120. Collimator 120 receives optical signal 16a from circulator 27 and collimates optical signal 16a to form a collimated, multiplexed optical signal 16b. Collimator 120 is operable to prevent scattered light—light not traveling parallel to the length of collimator 120—from being transmitted to a grating 140 included in DGEM 100. Examples of collimator 120 are well known in the art.

Once optical signal 16b has been collimated, the signal is transmitted to grating 140. A grating is any optical device whose operation involves interference among multiple optical signals originating from the same source but with different phase shifts. In WDM communication systems, gratings are used as demultiplexers to separate the individual wavelengths. In a typical grating, multiple narrow slits are spaced equally apart on a plane, called a grating plane. Light incident from a source on one side of the grating is transmitted through these slits. The light transmitted through each slit is diffracted, effectively separating a WDM optical signal into its component wavelengths. In one embodiment, grating 140 is a transmissive grating operable to separate the incoming collimated, multiplexed signal 16b into its component channels, having wavelengths $\lambda_1$-$\lambda_n$. A transmissive grating a grating in which multiple transmissions of the optical signal occur. Transmissive gratings capable of this functionality are common optical components and are well known in the art. Although the use of a transmissive grating is discussed, reflective gratings may also be implemented. A reflective grating is a grating in which the transmission slits are replaced by narrow reflecting surfaces, with the rest of the grating surface being nonreflecting. The principle of operation of a reflective grating is exactly analogous to that of the transmission grating. Reflective gratings are also well known in the art.

In the illustrated embodiment, optical signal 16b falls incident to grating 140 from collimator 120. Grating 140 separates optical signal 16b into its component wavelengths 134 ($\lambda_1$-$\lambda_n$) and directs wavelengths 134 towards optics group 138. Optics group 138 may comprise a condenser lens or any other device suitable to focus wavelengths 134, as is well known in the art. Optics group 138 is configured to focus each wavelength 134 onto a different portion of a light modulator 150. It should be noted that a portion of optical signal 16b will be separated from the main signal when optical signal 16b falls incident onto grating 140 after passing through collimator 120. This separated, or lost, optical signal is represented by arrow 136. However, the amount of this loss is usually small in comparison to the amount of light separated by grating 140 and directed toward optics group 138.

Light modulator 150 is operable to equalize a desired characteristic of wavelengths 134 that are transmitted to light modulator 150 by optics group 138, such as the optical signal strength of each wavelength 134. Light modulator 150 may be any form of spatial light modulator, such as a digital micro-mirror device (DMD), or a coherent light modulator. Equalization using spatial light modulators, including DMDs, is well known in the art. A typical DMD comprises several hundred thousand mirrors, each mounted on tiny hinges that enable the mirrors to tilt either toward the light source (ON) or away from the light source (OFF). In the illustrated embodiment, each wavelength 134 is directed to a different set of micromirrors. Depending on the desired change in signal strength of each wavelength 134, a certain percentage of micromirrors in each set are turned off. When certain micromirrors in a set are turned off, the "off" mirrors reflect light away from the source, thus reducing the signal strength of the wavelength incident on the set of mirrors. If all mirrors in a set of micromirrors remain "on," the set of mirrors reflects substantially all of the incident light back toward the source, leaving the signal strength of the associated wavelength substantially unchanged. By varying the percentage of micromirrors in each set that are turned off, a DMD is capable of modulating the signal strength of each wavelength 134 and consequently the signal strength of optical signal 16.

Optics group 138 focuses the modulated wavelengths 134 received from modulator 150 onto grating 140. Some post-modulation light incident to grating 140 from optics group 138 is separated from the main optical signal (as with separated light 136 from optical signal 16b incident upon grating 140 from collimator 120, as described above). In general, the amount of separated light is small, amounting to only about 5% of the signal incident onto grating 140. Therefore, a majority of light comprising wavelengths 134 is recombined (multiplexed) by grating 140 as optical signal 16c and is directed towards collimator 120.

In a typical DGE, the light that is separated from the modulated light incident on the grating from the light modulator is typically lost and unused. In contrast, DGEM 100 directs the light that would typically be lost (indicated by wavelengths 144) onto an optics group 139. In this manner, the light which would be lost in a typical DGE may be used to monitor the optical performance of system 10. Optics group 139 is used to focus each wavelength 144 onto a different portion of a detector array 160. Optics group 139 may comprise a condenser lens or any other optical device suitable to focus wavelengths 144. Each portion of detector array 160 generates an electrical signal proportional to the incident optical power of each wavelength 144. Detector array 160 may be an Indium-Gallium-Aresenide (InGaAs) linear detector array, typical of detector arrays commonly used in OPMs. In other embodiments, detector array 160 may contain a single portion that generates an electrical signal proportional to incident optical power or detector array 160 may contain less of such portions than there are wavelengths or channels in the optical signal. In such embodiments, multiple wavelengths of the signal may be successively scanned to the detecting portion(s) of the detector array using a rastering mirror or any other suitable device included in optics group 139.

In the illustrated embodiment, an analyzer 170 coupled to detector array 160 is operable to analyze those electrical signals and convert them into data 175 which is representative of the incident optical power. Data 175 are transmitted to a controller 180, which is operable to adjust light modulator 150 to achieve a desired level of optical performance, based on the analysis of the modulated light received by detector array 160. For example, controller 180 may be operable to direct light modulator 150 to modify the power of particular wavelengths 134 to attain an equalization of all wavelengths 134. Although specific components and configurations are discussed above and shown in FIG. 2, persons skilled in the art will recognize from this discussion that any combination of appropriate components configured in any appropriate manner may be utilized.

One skilled in the art will recognize that the components used to monitor wavelengths 144 (optics group 139, detector array 160, analyzer 170, etc.) may be located in the path of any lost optical signal transmitted through grating 140. For example, the performance monitoring components listed above may be located so as to monitor the lost optical signal 136. In this situation, the performance of the optical signals is monitored before the light is modulated, and the amount of needed modulation may be determined such that light modulator 150 is directed as to the proper amount of modulation required.

Figure 3:
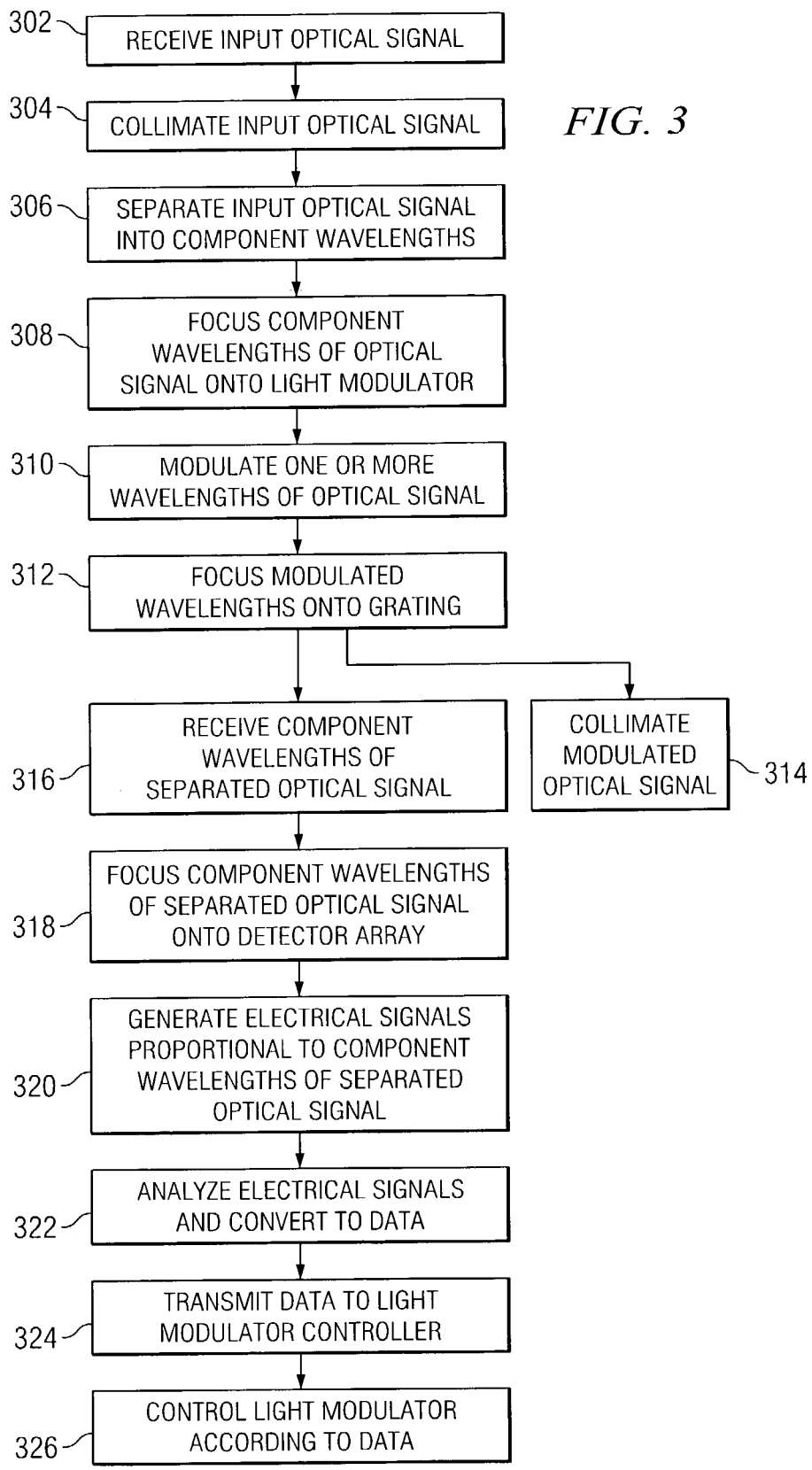
FIG. 3 illustrates an example method for equalizing and monitoring optical signals using a dynamic gain equalizer-monitor.

FIG. 3 illustrates an example method for equalizing and monitoring optical signals using DGEM 100. The example method begins at step 302, when DGEM 100 receives optical signal 16. In one embodiment, optical signal 16 will travel from optical communication medium 20 to circulator 27 to arrive at collimator 120. At step 304, optical signal 16 is collimated by collimator 120. As stated above, collimator 120 is operable to prevent scattered light—light not travelling parallel to the length of collimator 120—from being transmitted to grating 140.

At step 306, collimated optical signal 16 is separated into its component wavelengths 134 ($\lambda_1$-$\lambda_n$) by grating 140. As stated above, grating 140 may comprise a transmissive grating or a reflective grating. In particular embodiments, a portion of optical signal 16 input is lost through grating 140, as represented by lost optical signal 136. At step 308, wavelengths 134 are focused by optics group 138 onto light modulator 150. Optics group 138 may comprise a condenser lens or any other device suitable to focus wavelengths 134.

At step 310, wavelengths 134 are modulated by light modulator 150. In one embodiment, this modulation comprises equalizing the signal strength of wavelengths 134. As described above, light modulator 150 may comprise a spatial light modulator, such as a DMD. The equalization of wavelengths 134 occurs on the face of the DMD based on the number of mirrors that are activated, thereby dictating the amount of light in each wavelength that is reflected by the DMD toward optics group 138.

At step 312, modulated wavelengths 134 are reflected back to optics group 138, and optics group 138 focuses the modulated wavelengths onto grating 140. As stated above, some post-modulation light incident to grating 140 will be separated, as represented by wavelengths 144. The wavelengths 134 of the non-separated light are recombined (multiplexed) into a single optical signal 16b by grating 140 and directed towards collimator 140. At step 314, the recombined optical signal, represented by arrow 130, passes through collimator 120 before being directed back onto communications medium 20 by circulator 27.

At step 316, the separated wavelengths 144 are received by optics group 139. As stated above, wavelengths 144 represent light that is separated from the main optical signal (i.e., a loss of signal strength) as the optical signal is transmitted through grating 140. These wavelengths 144 are used to monitor the optical performance of system 10. At step 318, wavelengths 144 are focused onto detector array 160 by optics group 139. At step 320, detector array 160 generates an electrical signal proportional to the incident optical power of wavelengths 144. Detector array 160 may be an Indium-Gallium-Aresenide (InGaAs) linear detector array, typical of detector arrays commonly used OPMs.

At step 322, the electrical signals generated by detector array 160 are analyzed and converted into data 175 by analyzer 170. In one embodiment, data represent certain parameters of wavelengths 144, such as signal strength, signal-to-noise ratio, and wavelength. At step 324, data 175 are transmitted to controller 180. At step 326 data 175 are used to adjust the operation of light modulator 150 so as to achieve a desired optical performance, based on the analysis of the modulated light received by detector array 160.

Although an exemplary method is illustrated, the present invention contemplates using any suitable techniques and components for equalizing optical signals and monitoring optical performance in an optical network. For example, many of the steps in FIG. 3 may be performed by components other than those described and illustrated. Moreover, many of the steps in FIG. 3 may take place simultaneously and/or in different orders than as shown. In addition, the present invention contemplates using methods with additional steps, fewer steps, or different steps, so long as the methods remain appropriate for equalizing optical signals and monitoring optical performance in an optical network Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method, comprising:
    communicating an optical signal over a path of an optical communication medium, the optical signal comprising a multiplexed plurality of optical channel components of associated different wavelengths;
    redirecting the optical signal from the path of the optical communication medium;
    collimating the redirected optical signal;
    separating the collimated redirected optical signal into demultiplexed ones of the different wavelength channel components by directing the collimated redirected optical signal onto a grating plane for transmission through slits of an optical interference grating;
    directing the separated different wavelength channel components to be incident onto respective different portions of an array of modulator elements of a spatial light modulator;
    equalizing an optical signal strength of the incident different wavelength channel components through optical modulation by settings of the modulator elements of the respective different portions of the array;
    recombining the equalized different wavelength channel components into a remultiplexed optical signal by directing the equalized components in an opposite direction onto the grating plane for transmission through the slits of the optical interference grating;
    directing the remultiplexed optical signal back along the path of the optical communication medium; wherein a minor portion of light of the equalized components directed in the opposite direction for transmission through the grating and direction back along the path after remultiplexing is separated from a main portion due to losses;
    directing at least a part of the minor portion of light of the equalized components separated from the main portion at the grating due to losses onto a detector;
    generating electrical signals proportional to an optical power of each of the equalized components incident on the detector; and
    using the generated electrical signals as feedback to set the settings of the modulator elements of the respective corresponding different portions of the array.

2. The method of claim 1, wherein the minor portion amounts to about 5% of the light incident on the grating.

3. The method of claim 2, wherein the detector comprises a detector array; directing the at least part of the minor portion comprises directing at least part of a minor portion of the light of the separated different wavelength channel components to be incident onto respective different portions of the detector array; and the respective different portions of the detector array generate corresponding ones of the generated electrical signals.

4. The method of claim 2, wherein the detector comprises a detector array; directing the at least part of the minor portion comprises directing at least part of a minor portion of the light of the separated different wavelength channel components to be incident at different times onto a same portion of the detector array; and the same portion of the detector array generates corresponding ones of the generated electrical signals in synchronism with the different times.

5. The method of claim 4, wherein a rastering mirror is used to direct the light to be incident at the different times onto the same portion of the detector array.

6. The method of claim 3, wherein using the generated electrical signals as feedback to set the settings includes analyzing the generated electrical signals to generate data for control of the settings.

7. The method of claim 6, wherein an analyzer used to analyze the electrical signals and convert them to data, and the data is transmitted to a controller which adjusts the settings.

8. The method of claim 7, wherein the array of modulator elements of the spatial light modulator is an array of mirrors of a digital micromirror device (DMD); and the controller adjusts ON and OFF settings of the mirrors.

9. The method of claim 1, wherein the detector comprises a detector array; directing the at least part of the minor portion comprises directing at least part of a minor portion of the light of the separated different wavelength channel components to be incident onto respective different portions of the detector array; and the respective different portions of the detector array generate corresponding ones of the generated electrical signals.

10. The method of claim 1, wherein the detector comprises a detector array; directing the at least part of the minor portion comprises directing at least part of a minor portion of the light of the separated different wavelength channel components to be incident at different times onto a same portion of the detector array; and the same portion of the detector array generates corresponding ones of the generated electrical signals in synchronism with the different times.

11. The method of claim 10, wherein a rastering mirror is used to direct the light to be incident at the different times onto the same portion of the detector array.

12. The method of claim 1, wherein using the generated electrical signals as feedback to set the settings includes analyzing the generated electrical signals to generate data for control of the settings.

13. The method of claim 12, wherein an analyzer used to analyze the electrical signals and convert them to data, and the data is transmitted to a controller which adjusts the settings.

14. The method of claim 1, wherein the array of modulator elements of the spatial light modulator is an array of mirrors of a digital micromirror device (DMD); and the controller adjusts ON and OFF settings of the mirrors.

15. Apparatus for equalizing optical signal strengths of respective different wavelength optical channel components of a multiplexed optical signal communicated over a path of an optical communication medium, comprising:
    a circulator configured for redirecting the optical signal from the path of the optical communication medium;
    a collimator configured for collimating the redirected optical signal;
    an optical interference grating having a grating plane configured for receiving the collimated redirected optical signal from the collimator and separating the collimated redirected optical signal into demultiplexed ones of the different wavelength channel components by transmission through slits at the grating plane;

a spatial light modulator with an array of modulator elements configured for receiving the separated different wavelength channel components incident onto respective different portions of the an array of modulator elements;

a controller configured for controlling settings of the modulator elements of the respective different portions of the array for equalizing an optical signal strength of the incident different wavelength channel components; the array of modulator elements also being configured for directing the equalized components in an opposite direction onto the grating plane for transmission through the slits of the optical interference grating for recombining the equalized different wavelength channel components into a remultiplexed optical signal; and the grating plane is further configured for directing the remultiplexed optical signal back along the path of the optical communication medium; wherein a minor portion of light of the equalized components directed in the opposite direction for transmission through the grating and direction back along the path after remultiplexing is separated from a main portion due to losses;

a detector;

optics configured for directing at least a part of the minor portion of light of the equalized components separated from the main portion at the grating due to losses onto the detector; the detector being configured for generating electrical signals proportional to an optical power of each of the equalized components incident on the detector; and circuitry configured for providing feedback to the controller for setting the settings of the modulator elements of the respective corresponding different portions of the array using the generated electrical signals.

16. The apparatus of claim 15, wherein the minor portion amounts to about 5% of the light incident on the grating.

17. The apparatus of claim 16, wherein the detector comprises a detector array; the optics is configured for directing at least part of a minor portion of the light of the separated different wavelength channel components to be incident onto respective different portions of the detector array; and the detector array is configured so that the respective different portions of the detector array generate corresponding ones of the generated electrical signals.

18. The apparatus of claim 16, wherein the detector comprises a detector array; the optics is configured for directing at least part of a minor portion of the light of the separated different wavelength channel components to be incident at different times onto a same portion of the detector array; and the same portion of the detector array is configured to generate corresponding ones of the generated electrical signals in synchronism with the different times.

19. The apparatus of claim 18, wherein the optics includes a rastering mirror configured to direct the light to be incident at the different times onto the same portion of the detector array.

20. The apparatus of claim 17, wherein the circuitry comprises an analyzer configured for analyzing the generated electrical signals to generate data for control of the settings by the controller.

21. The apparatus of claim 20, wherein the array of modulator elements of the spatial light modulator is an array of mirrors of a digital micromirror device (DMD); and the controller is configured to adjust ON and OFF settings of the mirrors.

22. The apparatus of claim 15, wherein the detector comprises a detector array; the optics is configured for directing at least part of a minor portion of the light of the separated different wavelength channel components to be incident onto respective different portions of the detector array; and the detector array is configured so that the respective different portions of the detector array generate corresponding ones of the generated electrical signals.

23. The apparatus of claim 15, wherein the detector comprises a detector array; the optics is configured for directing at least part of a minor portion of the light of the separated different wavelength channel components to be incident at different times onto a same portion of the detector array; and the same portion of the detector array is configured to generate corresponding ones of the generated electrical signals in synchronism with the different times.

24. The apparatus of claim 23, wherein the optics includes a rastering mirror configured to direct the light to be incident at the different times onto the same portion of the detector array.

25. The apparatus of claim 15, wherein the circuitry comprises an analyzer configured for analyzing the generated electrical signals to generate data for control of the settings by the controller.

26. The apparatus of claim 15, wherein the array of modulator elements of the spatial light modulator is an array of mirrors of a digital micromirror device (DMD); and the controller is configured to adjust ON and OFF settings of the mirrors.

* * * * *